May 2, 1950 M. BECHIK ET AL 2,505,822
MACHINE FOR SEWING MATTRESS BOXING STRIPS
Filed April 12, 1947 9 Sheets-Sheet 1

Inventor
MICHAEL BECHIK AND
JOEL G. STRANDBERG
By Their Attorneys
Merchant & Merchant

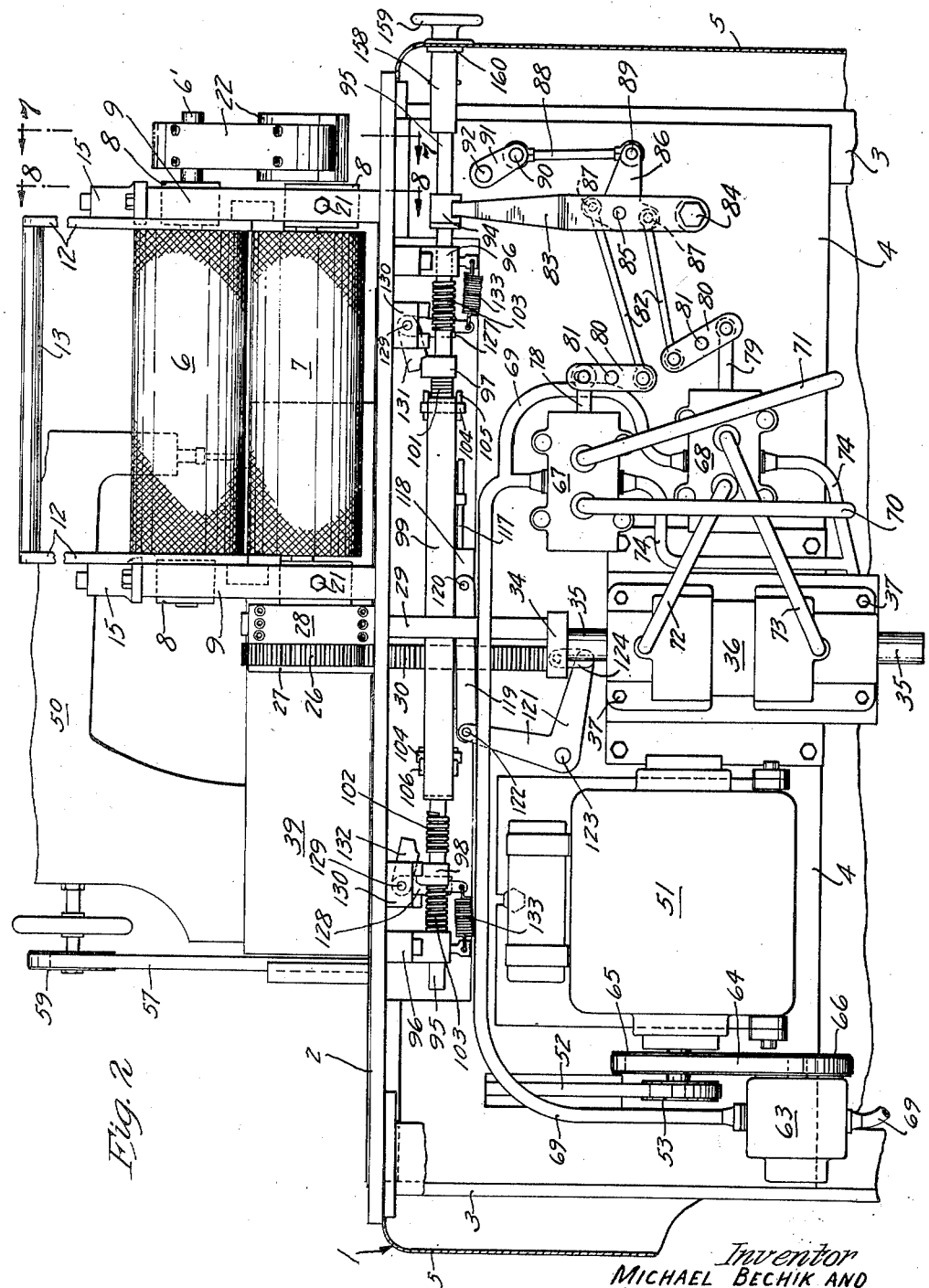

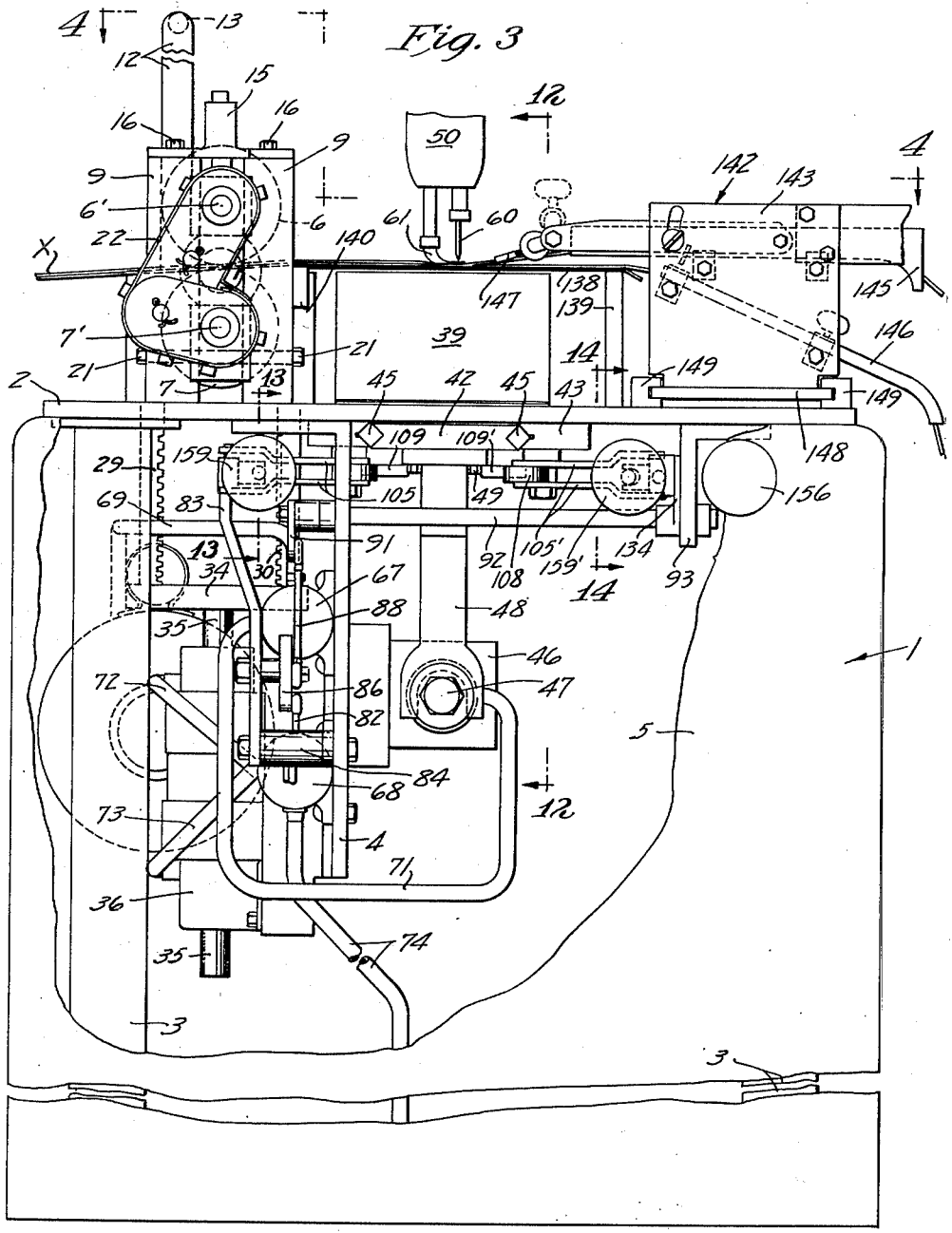

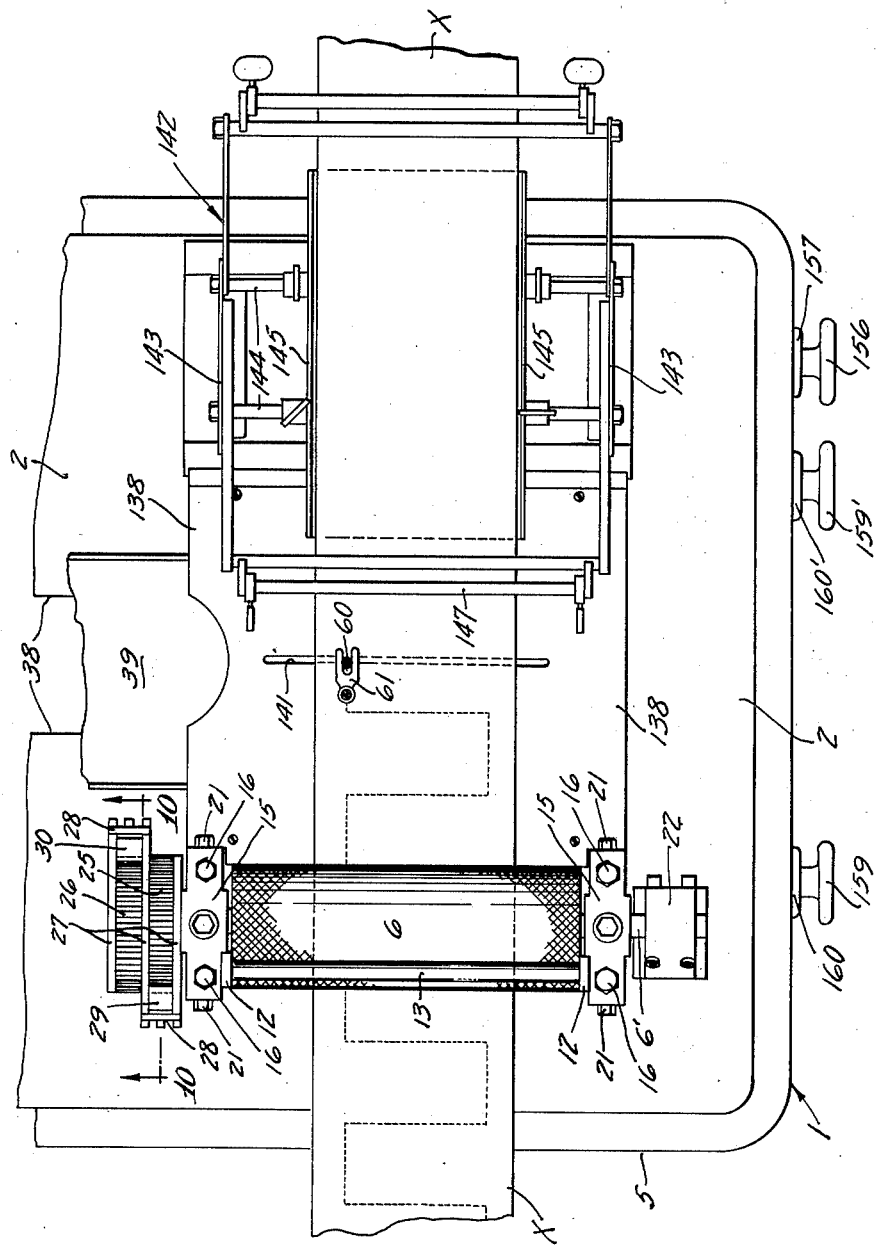

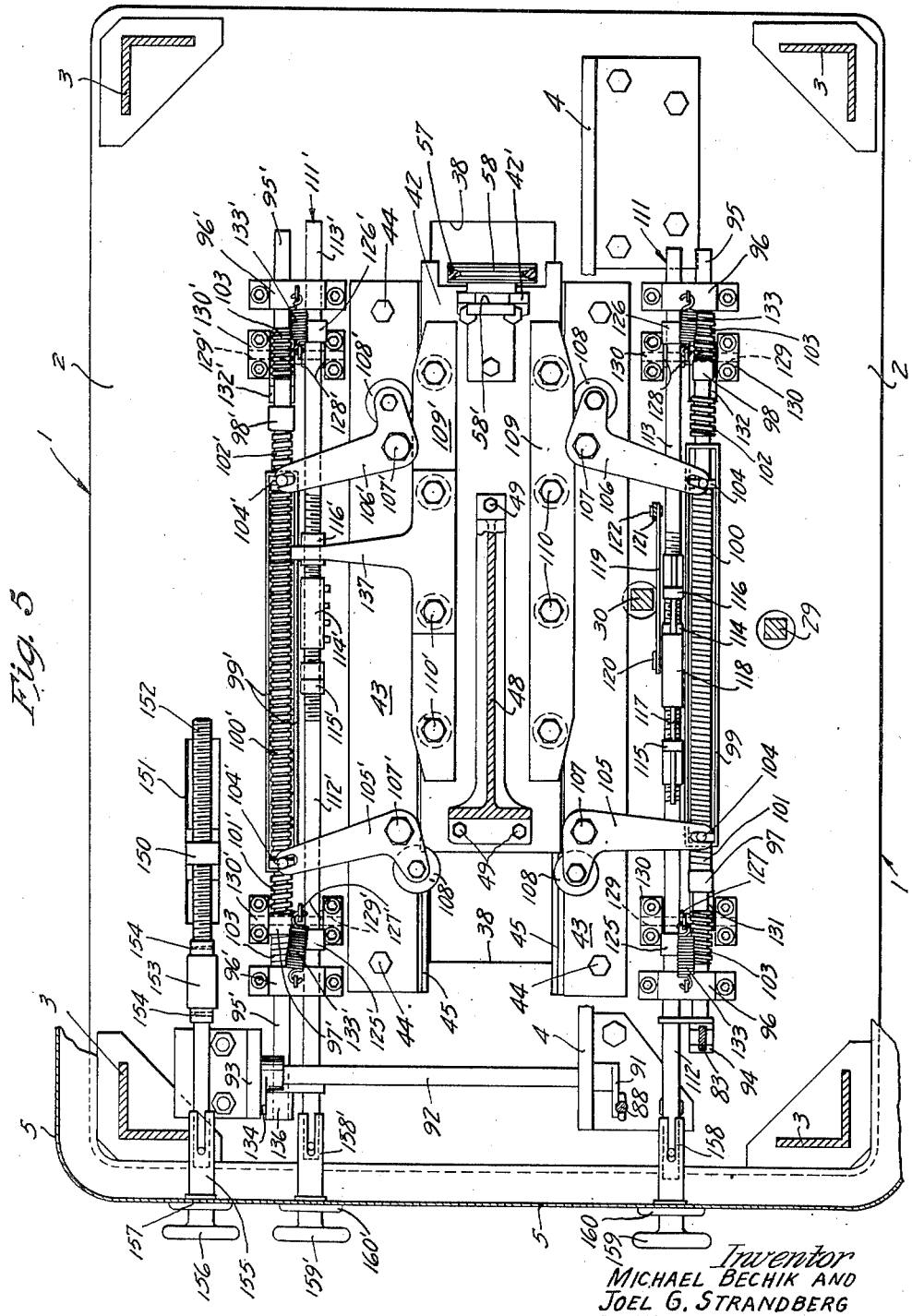

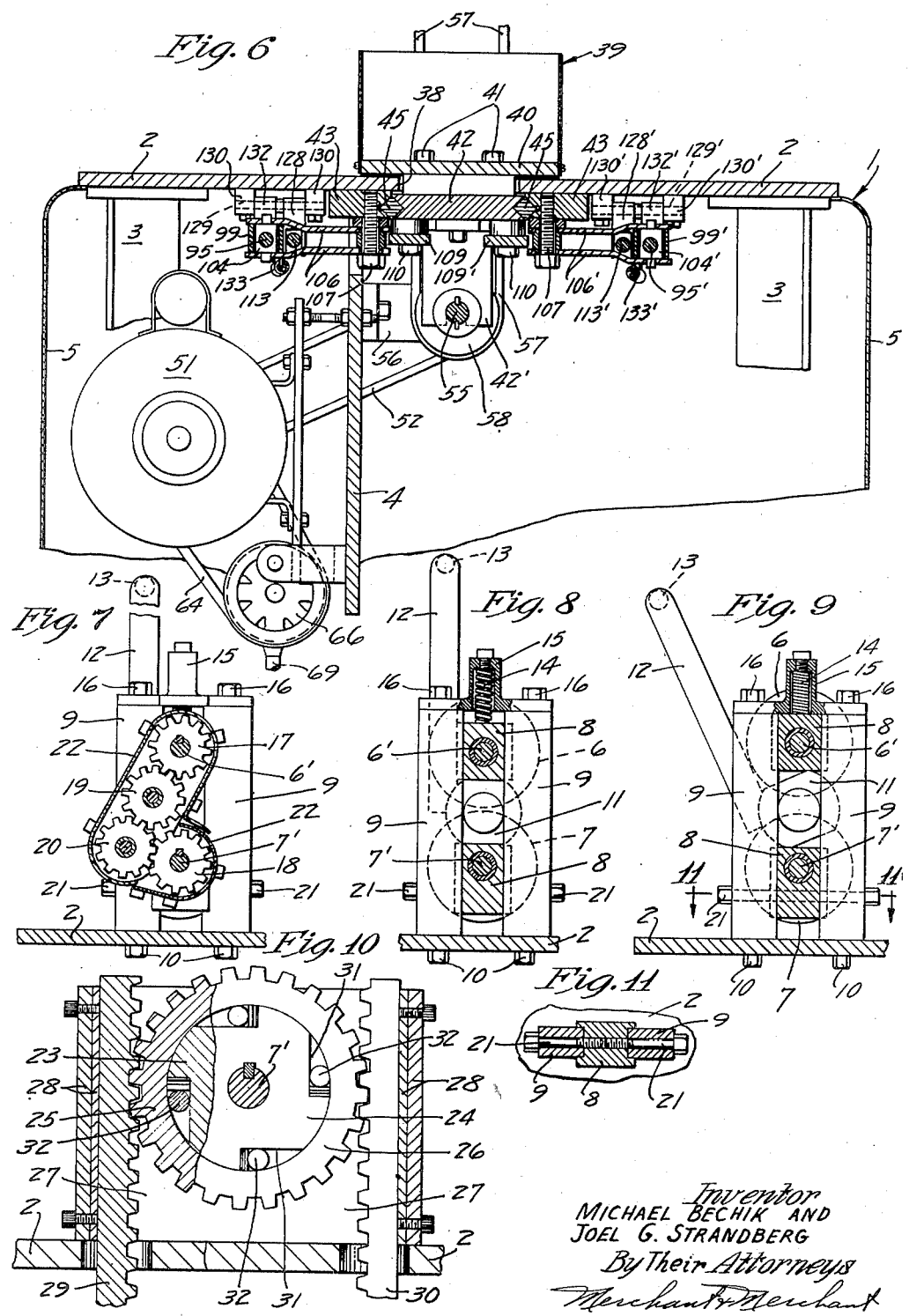

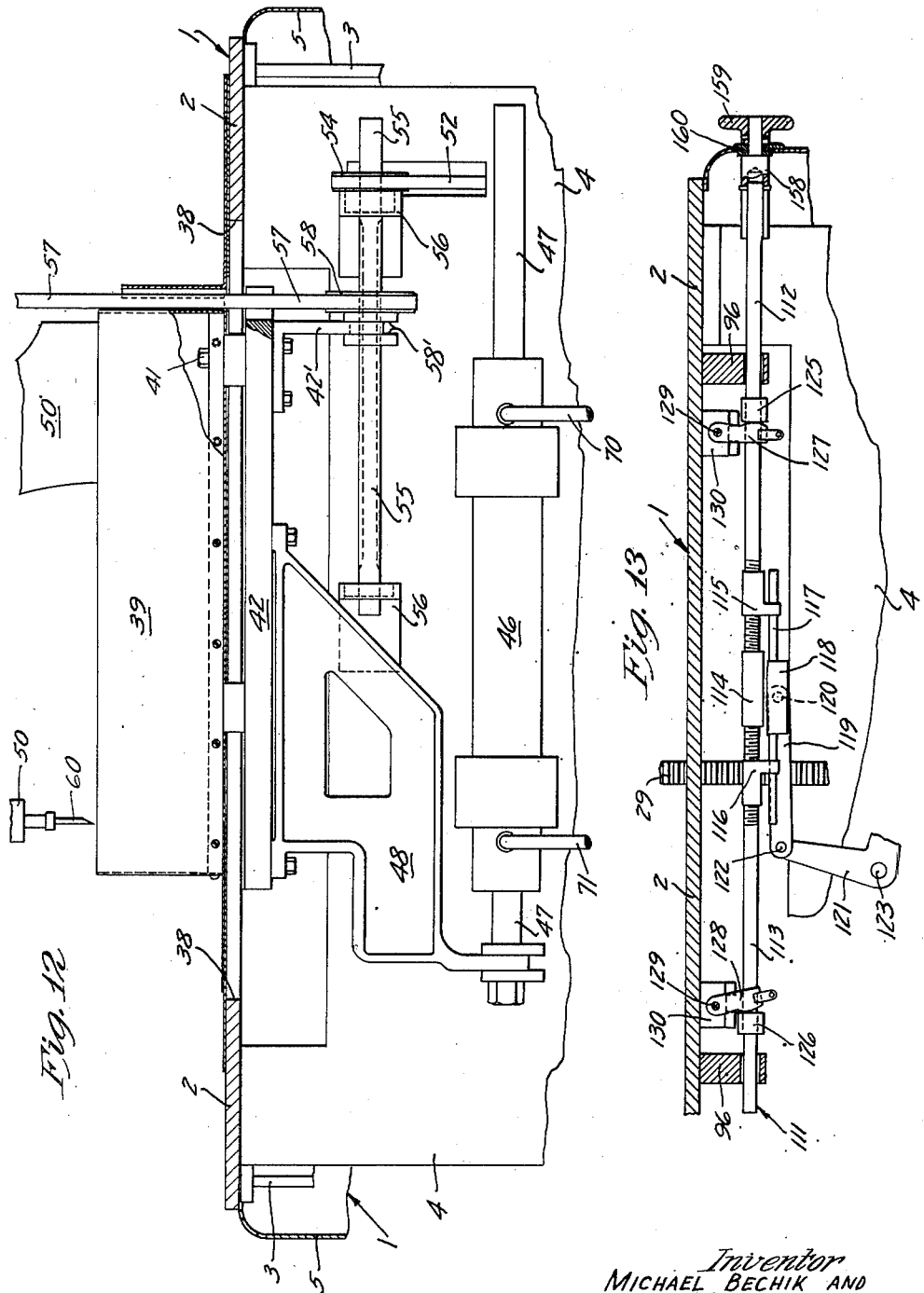

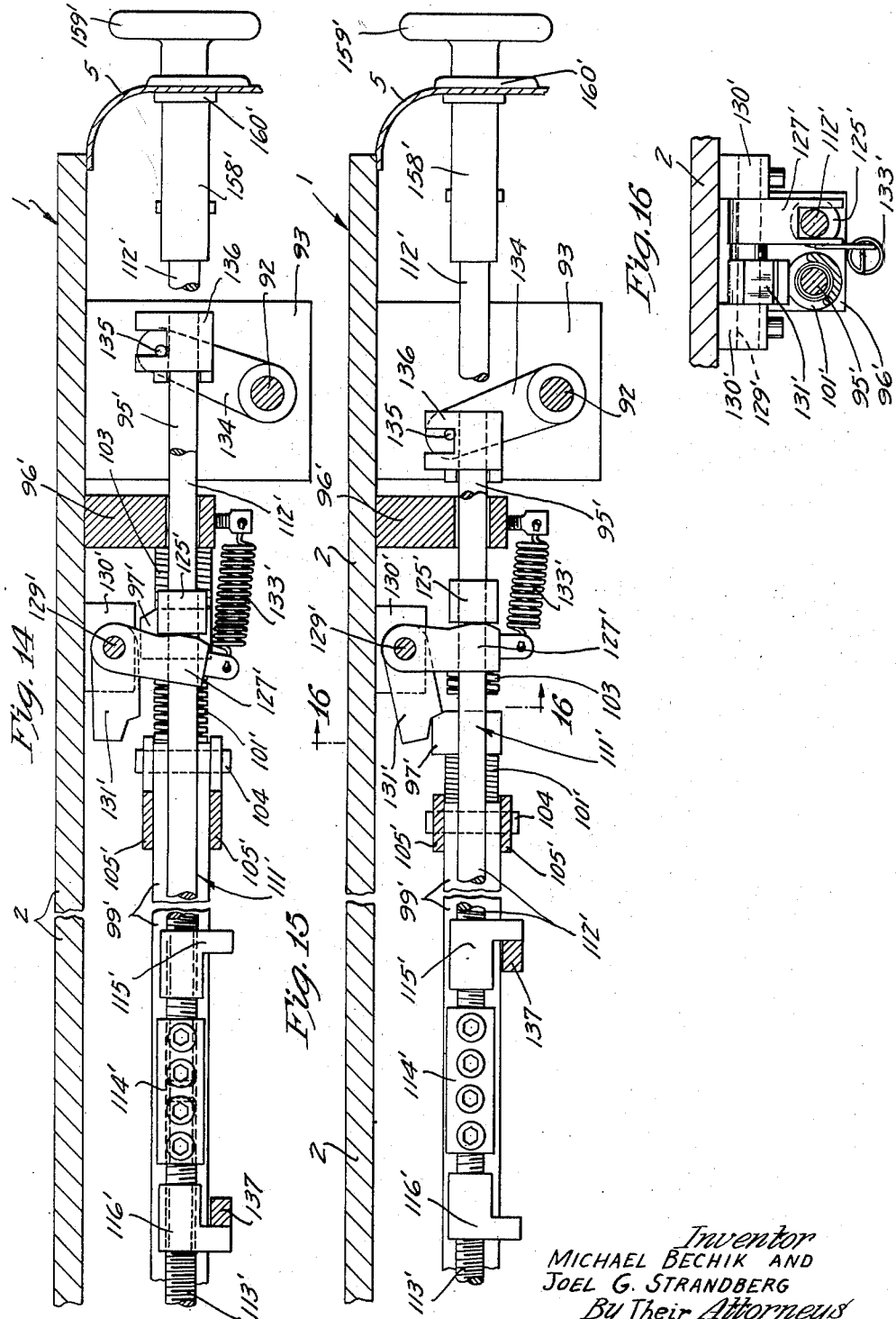

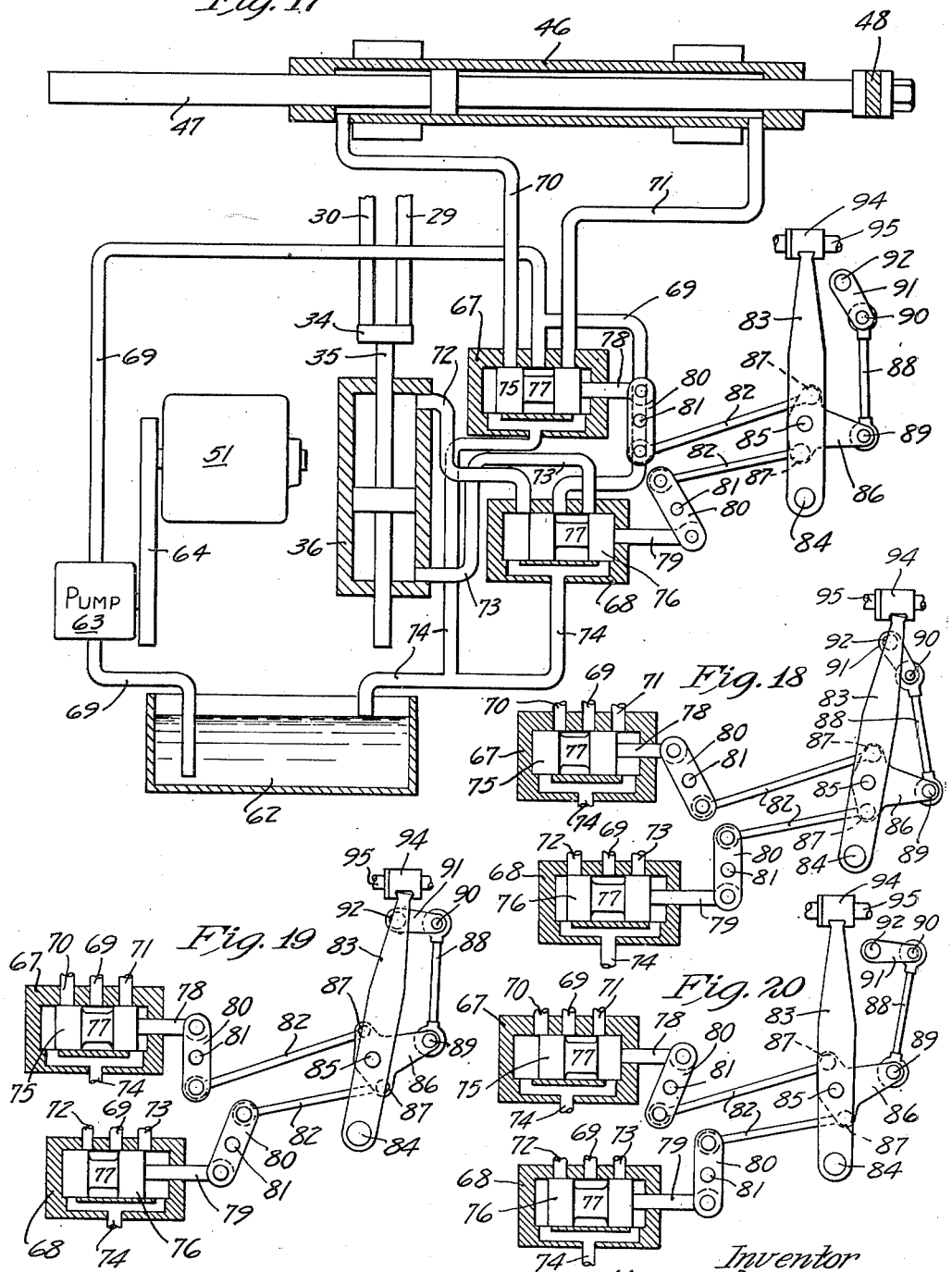

Patented May 2, 1950

2,505,822

UNITED STATES PATENT OFFICE 2,505,822

MACHINE FOR SEWING MATTRESS BOXING STRIPS

Michael Bechik and Joel G. Strandberg, St. Paul, Minn., assignors to Bechik Products Inc., St. Paul, Minn., a corporation of Minnesota Application April 12, 1947, Serial No. 741,124

24 Claims. (Cl. 112—2)

Our invention relates broadly to quilting machines and more specifically to devices for stitching together a plurality of plies of material such as used in mattress borders or the like.

An object of our invention is the provision of a machine of the above type, which automatically feeds material therethrough while the same is being continuously sewn in a pattern of stitching which extends both transversely and longitudinally thereof.

A still further object of our invention is the provision of means for simply and rapidly varying the length of both the longitudinal and transverse lines of stitching while the machine is in operation.

Another important object of our invention is the provision of a device having a pair of cooperating feed rollers and a sewing machine mounted on a reciprocating carriage which moves transversely of the line of feed, wherein said feed rollers and said carriage are automatically operated by hydraulic means.

A still further object of our invention is the provision of a novel combination of elements and arrangement of parts wherein the hydraulic mechanism is controlled by valve means operated by snap action mechanism.

A still further object of our invention is the provision of a device of the type immediately above-described, wherein said snap action mechanism is so arranged that movement of either the carriage or feed rollers to a predetermined point will cause termination of the movement thereof and simultaneously initiate movement of the other thereof, whereby the progress of the stitching mechanism is continuous and uninterrupted and the angles between the longitudinal and transverse lines of stitching are sharper than those of any machine heretofore developed.

Another object of our invention is the provision of a machine of the type above-described, wherein the number of stitches per unit of linear measure will not be varied by increasing or decreasing of the length of either the longitudinal or transverse lines of stitching.

A still further important object of our invention is the provision of a structure which is relatively simple in construction, has relatively few moving parts, and which is extremely durable and foolproof in operation.

The above and still numerous other advantages and objects of our invention will become apparent from the following detailed specification, appended claims, and attached drawings.

Referring to the drawings, wherein like characters indicate like parts throughout the several views:

Fig. 2 is a rear elevation of our improved machine with some parts being broken away;

Fig. 3 is a view in end elevation, some parts being broken away;

Fig. 4 is a fragmentary view, partly in plan and partly in horizontal section, taken on the line 4—4 of Fig. 3;

Fig. 5 is a view partly in horizontal section and partly in bottom plan, taken substantially on the line 5—5 of Fig. 1;

Fig. 6 is a fragmentary view in vertical section, taken substantially on the line 6—6 of Fig. 1;

Fig. 7 is a fragmentary section, taken on the line 7—7 of Fig. 2;

Fig. 8 is a fragmentary section taken substantially on the line 8—8 of Fig. 2, some parts being broken away;

Fig. 9 is a view corresponding to Fig. 8, but showing a slightly different position of some of the parts;

Fig. 10 is an enlarged fragmentary section taken substantially on the line 10—10 of Fig. 4;

Fig. 11 is a fragmentary view in section, taken on the line 11—11 of Fig. 9;

Fig. 12 is a fragmentary longitudinal section taken on the line 12—12 of Fig. 3;

Fig. 13 is a fragmentary section taken on the line 13—13 of Fig. 3;

Fig. 14 is an enlarged fragmentary section taken on the line 14—14 of Fig. 3;

Fig. 15 is a view corresponding to Fig. 14, but showing a different position of some of the parts;

Fig. 16 is a detail in section, taken on the line 16—16 of Fig. 15;

Fig. 17 is a diagrammatic view of the hydraulic operating mechanism of our invention;

Fig. 18 is a fragmentary view of the control valve means of Fig. 17, showing a second position of the valve elements;

Fig. 19 is a view corresponding to Fig. 18, but showing a third position of the valve elements; and Fig. 20 is a view corresponding to Fig. 18, but showing a fourth position of the valve elements.

Figure 1:
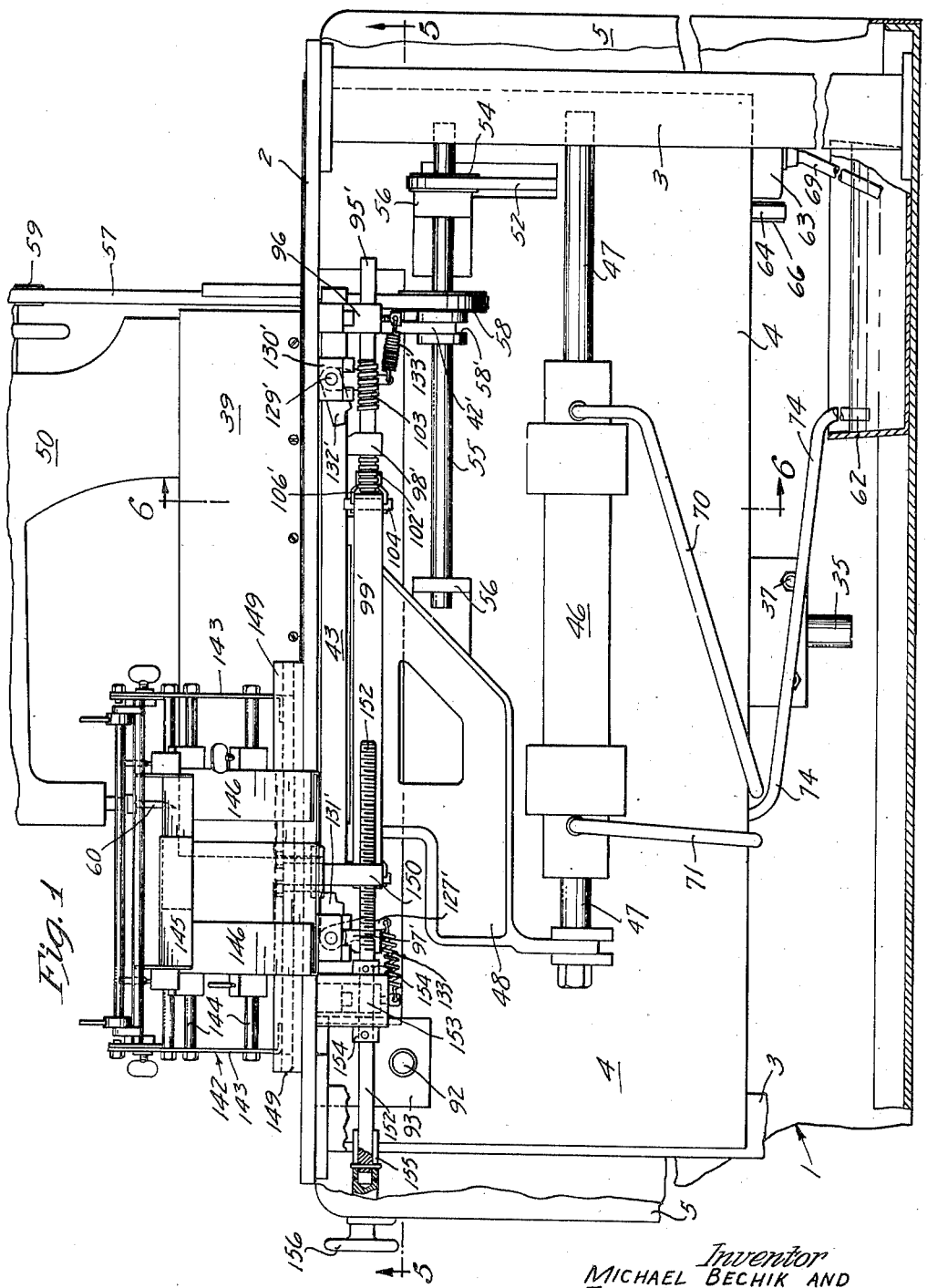
Fig. 1 is a fragmentary front elevation of our improved sewing machine, some parts being broken away.

*Description and operation of feed roller and carriage mechanisms*

Referring with greater particularity to the drawings, the numeral 1 indicates in its entirety a frame including a bed plate 2, supported adjacent its four corners by legs 3 and having depending therefrom a partition 4 and a skirt 5. A pair of cooperating feed rollers 6 and 7, preferably having knurled surfaces, are journalled in bearing blocks 8 in a pair of vertically disposed guide brackets 9. Guide brackets 9, in turn, are rigidly secured to bed plate 2, adjacent one edge thereof, by means of bolts or the like 10. Preferably, and as shown, the rollers may be spread, to facilitate insertion therebetween of material to be stitched, by means of cam-acting elements 11 interposed between the bearing blocks 8 within the guide brackets 9. Cam elements 11 are equipped with levers 12 joined by a handle member 13. A coil compression spring 14 within an adjustment screw-equipped cap 15, secured to the upper ends of the guide brackets 9 by means of screws 16, adjustably bias the rollers 6 and 7 toward each other. The rollers 6 and 7 (see Fig. 7) are caused to rotate in unison by means of spur gears 17 and 18 fast on shafts 6' and 7' of the feed rollers 6 and 7, respectively, and a pair of intermediate idler gears 19 and 20. The idler gears 19 and 20 are journalled in linkage, in a conventional manner, to allow the feed rollers 6 and 7 to be spread apart without loss of gear mesh therebetween. The bearing block 8 for the feed roller 7 is held against vertical movements in the guide brackets 9 by means of screws or the like 21 (see Figs. 9 and 11). A housing 22 encloses the spur gears 17 and 18 and the idler gears 19 and 20.

As shown particularly in Fig. 10, the shaft 7' projects through the roller 7, and at its end opposite to the spur gear 18, projects through the guide bracket 9 and has secured thereto a pair of over-riding clutch elements 23 and 24, each of which is provided at its periphery with an annular pinion gear 25 and 26, respectively. Spaced plates 27 on both sides of the gears 25 and 26, connected by guide members 28, form guideways for a pair of racks 29 and 30, which have meshing engagement with the annular pinion gears 25 and 26, respectively. The over-riding clutch elements 23 and 24 are notched as at 31 to contain roller elements 32. The roller elements 32 are biased by springs 33 toward camming engagement with the interior of the annular pinion gears 25 and 26.

It will here be noted that the racks 29 and 30 are disposed at opposite sides of the shaft 7' so that upward movement of the racks 29 and 30 will cause rotation of the pinion gears 25 and 26 in opposite directions. However, the disposition of the clutch elements 23 and 24 is such that upward movement of the racks will cause the clutch 23 to become operative while the clutch 24 remains inoperative, thus imparting a rotary movement to the feed rollers 7 in a counterclockwise direction with respect to Fig. 10. Upon downward movements of the racks 29 and 30, the clutch element 23 will become disengaged while the clutch element 24 becomes operative, thereby rotating the feed rollers 7 further in a counterclockwise direction with respect to Fig. 10.

The racks 29 and 30 are rigidly secured at their lower ends to a crosshead 34 of a piston-equipped plunger 35 which works in a double-ended hydraulic cylinder 36 which is secured to the partition 4 by means of bolts or the like 37.

The bed plate 2 is provided with a transverse elongated opening 38 in which a reciprocating carriage, identified in its entirety by the numeral 39, is adapted to travel. As shown, the carriage has a supporting plate 40, which is secured by screws or the like 41 to a slide 42 which, in turn, is mounted for sliding movements in a pair of ways 43, secured by bolts or the like 44 to the under side of the bed plate adjacent the opening 38, one on each side thereof. A pair of gibs 45 are interposed between the slide 42 and the ways 43 and may be carried by either one thereof.

Underlying the carriage in parallel relationship thereto is a double-ended cylinder 46 which is secured to the partition 4. A piston-equipped plunger rod 47 works within the cylinder 46 and, at one end, is connected with a bracket 48 that is secured to the slide 42 by means of bolts 49. A sewing machine 50, of conventional design, is mounted on the carriage 39 and is driven from a motor 51 by means of a V-belt 52 running over a pulley 53 on the motor and another pulley 54, which is fast on a countershaft 55, journalled in bearings 56 on the partition 4. A drive belt 57 runs over a pulley 58 which is keyed to the countershaft 55 for sliding movements thereon, and over a pulley 59 on the sewing machine. The sewing machinee is equipped with a reciprocating sewing needle 60 working through a presser foot 61. As heretofore stated, the sewing machine is of conventional design and no further description thereof need be made. A depending, bifurcated flange 42 works within a circumferential groove 59' in the hub of the pulley 58 to impart sliding movements thereto on the shaft 55 coincidental to movements of the carriage 39 in the ways 43.

*Description of hydraulic mechanism and control therefor*

The hydraulic cylinders 36 and 46 are adapted to be supplied with fluid from a reservoir 62, by means of a fluid pump 63 driven from the motor 51 by a belt 64 running over a pulley 65 on the motor 51 and a pulley 66 on the pump 63. Movements of the piston-equipped plunger rods within the cylinders 36 and 46 are controlled by means of control valves 67 and 68, respectively. The pump 63 receives fluid from the reservoir and supplies fluid under relatively high pressure to the valves 67 and 68, through a conduit 69. Conduits 70 and 71 extend from the valve 67 to opposite ends of the cylinder 46, and the conduits 72 and 73 extend from the control valve 68 to opposite ends of the cylinder 36. A conduit 74 extends from the control valves 67 and 68 to form a low pressure return to the reservoir 62.

The control valves 67 and 68 are provided with reciprocal valve elements 75 and 76 respectively, which are in the nature of pistons having reduced central portions 77.

It should now be apparent that, when either of the valve elements 75 or 76 is placed in one extreme position within the valve bodies 67 or 68 respectively, fluid under pressure will be forced into one end of a cooperating cylinder (46 or 36) and that fluid will be forced from the other end thereof, through the cooperating valve back to the reservoir 62. Likewise, when valve elements 75 and 76 are moved to their other extreme positions within the valve bodies 67 and 68 respectively, fluid under pressure will be forced from the reservoir 62 to the other ends of the cooperating cylinders 46 and 36 respectively. However, when either of the valve elements 75 or 76 is placed in a central position in the valve bodies 67 and 68 respectively, flow through either of the cylinders 46 and 36 will be blocked off. See particularly Figs. 17 to 20 inclusive.

The valve elements 75 and 76 are provided with extended stems 78 and 79 respectively that are each pivotally secured to one end of a pair of centrally pivoted links 80. The links 80 are pivotally secured to the partition 4 of the frame 1, as indicated at 81, and at their opposite ends have pivoted thereto connecting rods 82. An upstanding lever 83 is pivotally secured at its lower end to the partition 4, as indicated at 84, and is adapted to be moved by mechanism hereinafter to be described. Pivotally secured, as at 85, to the lever 83 is a T-shaped bell crank 86. The connecting rods 82 are pivotally secured to the ends of the diametrically-opposed short arms of the bell crank 86, as at 87. A substantially vertically-extending connecting rod 88 is pivoted at its lower end to the extreme end 89 of the central arm of the bell crank 86. At its upper end, the connecting rod 88 is pivoted to the outer end 90 of a crank arm 91 which is fast on a rock shaft 92 journalled in a bearing 93 and the partition 4. The lever 83 and the mechanism comprising the rock shaft 92, crank arm 91, connecting rod 88, and bell crank 86, cooperate to properly position the valve elements 75 and 76 in the valve bodies 67 and 68 respectively to control movements of the piston-equipped plungers 47 and 35 respectively. It will be seen, by reference to Figs. 17 to 20 inclusive, that different combinations of positions of the lever 83 and the crank arm 91 cause the valve elements 75 and 76 to assume different combinations of positions in the valves 67 and 68 respectively, so that with the lever 83 and the crank arm 91 in the positions shown in Fig. 17, the valve element 75 and 76 are positioned to block off flow to and from the cylinder 46, but to allow fluid under pressure to enter the lower end of the cylinder 36 and subsequently cause upward movement of the piston-equipped plunger rod 35. Referring now to Fig. 18, it will be noted that the crank arm 91 is in the same position as that of Fig. 17, but that the lever 83 has been moved to the right with respect to Fig. 17. It will here be seen that the valve element 76 is moved to a position blocking off flow of fluid to and from the cylinder 36 and that the valve element 75 is simultaneously positioned so as to allow fluid under pressure to flow from the pump 63 through conduits 69 and 70 to one end of the cylinder 46, thus forcing the plunger rod 47 from the left toward the right with respect to Fig. 17. Referring now to Fig. 19, it will be seen that the lever 83 has been retained in the position of Fig. 18, but that the crank arm 91 has been rotated in a counterclockwise direction with respect to Fig. 19 to cause the valve element 75 to be placed in an intermediate position in the valve body 67 to block off flow of fluid to and from the cylinder 46, and that the valve element 76 has been simultaneously placed in an extreme position in the valve body 68 to allow fluid to be forced through the conduits 69 and 72 to the upper end of cylinder 36 to cause downward movement of the piston-equipped plunger 35. With reference now to Fig. 20, it will be seen that the crank arm 91 is retained in the position of Fig. 19 but that the lever 83 has been moved back to the position of Fig. 17 causing the valve element 76 to be placed in a central position in the valve body 68 so as to block off flow to and from the cylinder 36. The valve element 75 has been simultaneously moved to an extreme position wherein fluid is allowed to flow under pressure from the pump 63 through the conduits 69 and 71 into the cylinder 46 to move the piston-equipped plunger rod 47 in a direction from the right to the left with respect to Fig. 17.

*Description of snap action mechanism*

At its upper end, lever 83 has a loose tongue-and-groove connection with a collar 94, fast on a push rod 95, adjacent one end thereof. Push rod 95 is suitably mounted for sliding movements in bearings 96 secured to the under side of the bed plate 2 adjacent one side of the path of travel of the carriage 39. A pair of abutments, in the nature of collars 97 and 98, are secured fast to the push rod 95 in spaced relationship, one to the other, intermediate the bearings 96. A rectangular open-sided frame 99 is mounted for sliding movements on the push rod 95 between the collars 97 and 98 and contains therein a coil compression spring 100 encompassing the push rod 95. The frame 99 is of less length than the distance between the collars 97 and 98 and has interposed therebetween, and the collars 97 and 98, a pair of coil compression springs 101 and 102 respectively. A pair of cushioning springs 103 encompass the push rod 95, one each between the collars 97 and 98 and their adjacent bearings 96. Mounted for sliding movements on the push rod 95 at each end of the spring 100, within the frame 99, is a stud-equipped collar 104. The stud-equipped collars 104 have working engagement with the bifurcated ends of a pair of bell cranks 105 and 106 which are intermediately pivoted to one of the guideways 43 as at 107. The bell cranks 105 and 106 at their free ends are equipped with rollers 108 which, upon reciprocation of the carriage 39, are adapted to engage a cam plate 109 which is secured to the slide 42 of the carriage 39, by means of bolts 110 or the like.

Mounted for longitudinal sliding movements in the bearings 96 adjacent the push rod 95, and parallel thereto, is a trip rod indicated in its entirety by the numeral 111 and which comprises a pair of trip rod sections 112 and 113 joined by a coupling 114. The adjacent ends of the rod sections 112 and 113 are reversely threaded. The threaded portion of each of the trip rod sections 112 and 113 carry a pair of lugs 115 and 116 respectively, one on either side of the coupling 114. Mounted for sliding movements in the spaced lugs 115 and 116 is a slide rod 117 which is spaced from, but parallel to, the trip rod 111, and has fast thereon, intermediate the lugs 115 and 116, a tripping element in the form of a block 118. A link 119 has one end thereof pivoted to the block 118, as at 120, and the other end pivotally secured to one end of a bell crank lever 121, as at 122.

The bell crank 121, at its intermediate portion, is pivotally mounted to the partition 4, as indicated at 123. At its other end, the bell crank 121 is pivoted to one end of a relatively short link 124, the other end of which is pivotally secured to the crosshead 34 (see particularly Fig. 2). Mounted fast on the trip rod sections 112 and 113 respectively, in spaced relation and between the bearings 96, are a pair of collars 125 and 126, respectively. The collars 125 and 126 are positioned to engage, under sliding movements of the trip rod 111, a pair of bifurcated crank arms 127 and 128 respectively that are fast, one adjacent each end of a pair of pivot pins 129 having their axes transversely of the direction of movement of the trip rod 111 and journalled in bearings 130 on the under side of the bed plate 2. Mounted fast adjacent the opposite ends of the pivot pins 129 is a pair of dogs 131 and 132 which are adapted to engage the abutment-forming collars 97 and 98 respectively on the push rod 95. A pair of coil extension springs 133 have each one end secured to a bearing 96 and another end thereof fastened to one of the crank arms 127 and 128. The springs 133 exert yielding bias upon the crank arms 127 and 128 to move their respective dogs 131 and 132 into the path of travel of the abutment-forming collars 97 and 98 respectively.

The rock shaft 92 is provided adjacent one of the bearings 96 thereof with a crank 134 mounted fast thereon. At its free end, the crank 134 is provided with a pin 135 which works in a slotted collar 136 fast on the end of a push rod 95'. Push rod 95' is mounted in suitable bearings 96' and is parallel both to the path of travel of carriage 39 and to the push rod 95. Most of the structure now about to be described is identical to the snap action mechanism immediately above described and disposed on the opposite side of the carriage 39 therefrom. Thus, it will be noted that the push rod 95' is provided with abutment-forming collars 97' and 98', open-sided rectanuglar frame 99', a coil spring 100' carried therein, compression springs 101' and 102', cushion springs 103', and collars 104'. A pair of bell cranks 105' and 106' pivoted at 107' and carrying rollers 108' respectively are adapted to engage the cam plate 109', opposed to the cam plate 109 on the under side of the slide 42, and are attached thereto by bolts 110'. A trip rod 111' is made up of trip rod sections 112' and 113' connected by a coupling 114' and is provided with lugs 115' and 116' threaded thereon in the same manner as the lugs 115 and 116 are threaded unto the sections 112 and 113 respectively. A trip finger 137 is carried by the cam plate 109' and is adapted, under reciprocation of the cam plate 109', to engage either one of the lugs 115' or 116' to move the trip rod 111'. The trip rod 111' is provided with a pair of collars 125' and 126' which, under movements of the trip rod 111', engage crank arms 127' and 128' respectively that are fast, one adjacent each end of a pair of pivot pins 129' having their axes transversely of the direction of the movement of the trip rod 111' and journalled in bearings 130' on the under side of the bed plate 2. A pair of dogs 131' and 132' mounted adjacent the opposite ends of the pins 129' are adapted to engage the abutment-forming collars 97' and 98' respectively. A pair of coil extension springs 133' have each one end secured to a bearing 96' and another end thereof fastened to one of the crank arms 127' and 128'. The springs 133' exert yielding bias upon the crank arms 127' and 128' to move their respective dogs 131' and 132' into the path of travel of the abutment-forming collars 97' and 98' respectively.

A work table 138 is mounted on legs 139 at one end thereof, on the bed plate 2, and at the other end thereof on a cross member 140 secured to the guide brackets 9 of the feed roller mechanism. The work table 138 is situated in the line of feed of the feed roller mechanism and on a horizontal plane substantially coincidental with a plane extending between the feed rollers 6 and 7. The work table 138 is provided with a transversely extending slot 141 for reciprocation of the needle 60 of the sewing machine 50 during its travel transversely of the line of feed of the strip of material to be stitched, identified by the letter x. The material x is, of course, fed across the machine by the feed rollers 6 and 7 and usually consists of two or more plies of material. The material is generally fed from supply feed rolls not shown and is guided unto the work table 138 by means of guide mechanism identified in its entirety by the numeral 142. The guide mechanism is made up of a pair of spaced side members 143 having cross bars 144 thereon upon which are adjustably mounted guide flanges 145 and 146. An adjustable guide rod 147 acts as a holddown for the material x immediately prior to the stitching thereof. It will be seen from the above that the guiding flanges may be adjusted to receive different widths of material and the material may further be stitched either adjacent one side or the other thereof or in the center portion thereof by means now to be described.

The side members 142 of the guide mechanism are joined at their bottom portions by a base plate 148 secured thereto and slidably mounted in a pair of guideways 149 that extend transversely of the line of feed. See particularly Figs. 1, 3, and 4. A depending lug 150 fast on the base plate 148 extends downwardly through a slot 151 in the bed plate 2 and has threaded engagement adjacent its lower end with an adjusting screw 152. The adjusting screw is journalled in a bracket 153 depending from the bed plate 2 and is held against longitudinal movements therein by collars 154 pinned or otherwise secured thereto. One end of the adjusting screw 152 is coupled as at 155 to an adjusting knob 156, which is journalled in a bearing 157 in the skirt 5. It will be apparent that turning of the knob 156 and the adjusting screw 152 will move the entire guide mechanism 142 in one direction or the other in a line transversely of the line of feed of the material x. This adjustment, together with adjustable guide flanges 145 and 146, readily provides for the feeding and stitching of materials of different widths and for stitching of different predetermined portions of the materials.

It will be noted, by reference to Fig. 4, that our machine is capable of sewing a continuous line of stitching having portions alternately longitudinally and transversely of the material x. The length of stitching in both directions is independently adjustable by means now to be described.

The extent if movement of the feed rollers 6 and 7 is determined by the spacing of the lugs 115 and 116 on the trip rod 111. This spacing of the lugs 115 and 116 is adjusted by rotation of the trip rod 111 within the bearings 96 and, due to the fact that the trip rod sections 112 and 113 are reversely threaded, rotation of the trip rod 111 will cause the space between the lugs 115 and 116 to be enlarged or contracted depending on the direction of rotation. The outer end of the trip rod section 112 is telescoped in and has slot-and-pin engagement with the extended shank 158 of an adjusting knob 159 journalled in a bearing 160 in the skirt 5. In like manner, the extent of travel of the carriage 39 is determined by the spacing of the lugs 115' and 116' on the trip rod 111'. The outer end of the trip rod section 112' is telescoped within and has slot-and-pin engagement with the extended shank 158' of an adjusting knob 159' journalled in a bearing 160' in the skirt 5. It will be readily seen that by turning either of the knobs 159 or 159' in either direction, the longitudinal or transverse length of the lines of stitching may be varied at will.

Summary of operation

As heretofore stated, the material x is adapted to be fed through the guide mechanism 146 over the work table 138 and through the feed rollers 6 and 7. The longitudinal portion of stitching is sewn into the material x during a cycle of operation, wherein the material is being fed across the table by means of the feed roller mechanism and wherein the carriage 39 is stationary at one end or the other of its cycle of travel transversely of the line of feed. When the predetermined length of stitching has been sewn, the motion of the feed rollers 6 and 7 is arrested, and simultaneously the transverse cycle of travel of the carriage 39 is initiated whereby to produce the transverse line of stitching.

With the elements of the snap action mechanisms in the position shown in Figs. 1, 2, 5, and 15, and the control valve mechanism in the position shown in Fig. 17, the carriage 39 is stationary at one end of its cycle of travel and the plunger 35 is moved in an upward direction whereby to cause rotation of the feed rollers 6 and 7. At this point, it will be noted that the springs 100 and 101 are compressed to bias the abutment-forming collar 97 toward the left with respect to Fig. 5. Continued upward movement of the plunger 35 causes the block 118 to be moved toward engagement with the lug 116 (see particularly Figs. 5 and 13). Further movement of the lug 118 will cause the trip rod 111 to move longitudinally to a point where engagement of the collar 125 thereon with the crank arm 127 will raise the dog 131 out of the line of travel of the collar 97 and away from abutting engagement therewith. This disengagement allows pressure of the springs 100 and 101 to snap the push rod 95 in a direction from right to left with respect to Fig. 5 and cause the lever 83 and the valve elements 75 and 76 connected thereto to be snapped over from the position shown in Fig. 17 to the position shown in Fig. 18. With the valve element 76 in the position shown in Fig. 18, flow of fluid is blocked off to and from the cylinder 36, thus causing the plunger 35 to be held in a stationary condition; and with the simultaneous placing of the valve element 75 in the position of Fig. 18, fluid under pressure is forced from the pump 63 through the conduit 69 into the valve 67. From thence, it is forced through the conduit 70 into one end of the cylinder 46 causing the plunger 47 and the carriage 39 carried thereby in a direction from the right to the left with respect to Fig. 5. During this time, fluid is moved from the other end of the cylinder 46 through the conduit 71, the valve 67, and the conduit 74 to the reservoir 62.

Movement of the carriage 39 from the right to the left with respect to Fig. 5 causes the cam rollers 108 of the cantilevers 106 and 106' to be disengaged from the cams 109 and 109' respectively and further movement of the carriage 39 causes engagement of the rollers 108 of the cantilevers 105 and 105' to be engaged by the cams 109 and 109' respectively. As the cantilevers 105 and 105' are moved by cam engagement with their respective cams, the springs 100 and 100' and 102 and 102' are forced toward compressed condition against the collars 98 and 98' respectively. The dogs 132 and 132' being pulled into the path of travel of the collars 98 and 98' respectively by the springs 33, stop movement of the collars 98 and 98'. Movement of the trip finger 137 on the carriage 39 will cause it to engage the lug 115' on the trip rod 111' to move the same in a direction from the right to the left with respect to Fig. 5. This movement causes engagement of the crank arm 128' by the collar 126' on the trip rod section 113' to withdraw the dog 132' out of engagement with the collar 98' whereby to allow action of the springs 100' and 102' to snap the push rod 95' in a direction from the left to the right with respect to Fig. 5 to rotate the rock shaft 92 in a counterclockwise direction with respect to Figs. 17 to 20 inclusive. This movement will place crank arm 91 and the connecting rod 88 in the position shown in Fig. 19. It will be noted that during this cycle of operation, there has been no movement of the lever 83. However, positioning of the crank arm 91 moves the T-shaped bell crank 86 to a position where its connections with the valve elements 75 and 76 simultaneously position them so that flow of fluid is blocked off from the cylinder 46 and so that fluid under pressure will be pumped through the conduit 69 through the valve 68 to the upper portion of the cylinder 36, whereby to force the piston-equipped plunger 35 in a downwardly direction. Downward movement of the piston 35 will cause the block 118 to move in a direction from the right to the left with respect to Fig. 5 into engagement with the lug 115 on the trip rod 111. Further movement of the plunger 35 will cause the trip rod 111 to be moved to a point where the collar 126 thereon has engaged the crank arm 128 to a point where it causes disengagement of the dog 132 with the collar 98. This disengagement will allow the springs 100 and 102 to snap the push rod 95 from the left to the right with respect to Fig. 5 and position the lever 83, as shown in Fig. 20, causing simultaneous movements of the valve elements 75 and 76. This positioning of the valves 75 and 76 will block off flow to and from the cylinder 36 and allow fluid under pressure to be pumped through the conduit 69, valve 67, and conduit 71, to one end of the cylinder 46 to force the plunger 47 and the carriage 39 in a direction from the left to the right with respect to Fig. 5. Movement of the carriage 39 from the left to the right with respect to Fig. 5 will cause engagement of the lug 116' by the trip fingers 137 to move the trip rod 111' from the left to the right with respect to Fig. 5. This movement will cause the collar 126' to engage the crank arm 128' whereby to disengage the dog 132' from the collar 98'. This disengagement will, of course, allow the springs 100' and 102' to snap the push rod 95' in a direction from the left to the right with respect to Fig. 5 and rotate the rock shaft 92 in clockwise direction with respect to Fig. 17 to position the valve elements 75 and 76 from that of Fig. 20 to that of Fig. 17 thereby completing a full cycle of operation.

Subsequent cycles of operation are identical to that immediately above-described and follow in uninterrupted sequence providing a continuous line of stitching in the material $x$ as it is fed through the machine.

Our invention has been completely tested and found to be entirely satisfactory for the accomplishment of the above objects; and while we have disclosed a commercial form of our invention, it should be obvious that the same is capable of considerable modification without departure from the scope of the appended claims.

What we claim is:

1. In a machine of the kind described, a cooperative pair of feed rollers adapted to receive the material between them, a pair of pinion gears, a pair of gear racks mounted for reciprocating movements and each meshing with a different one of said pinion gears, driving connections between each of said pinion gears and one of said feed rollers involving a pair of over-riding clutches, means for simultaneously reciprocating the gear racks including a double-ended hydraulic cylinder, a plunger rod-equipped piston working in the cylinder, a source of fluid pressure with connections in opposite ends of the cylinder, mechanical connections between the extended end of the plunger rod and said gear racks, and means for varying the length of the strokes of the gear racks to thereby vary the feeding travel of each of the feed rollers during each operating cycle, said over-riding clutches being constructed and arranged to impart feeding movements to the coupled feed rollers, one under extending movements of the gear racks and the other on retracting movements of the gear racks.

2. In a machine of the kind described, cooperating feed rollers, a double-ended cylinder and cooperating plunger-equipped piston, power-transmitting connections between the said plunger and the feed rollers converting reciprocating motion of the plunger into rotary motion of the feed rollers, a sewing machine mounted for reciprocating movements transversely of the line of feed, a double-ended cylinder and cooperating piston-equipped plunger rod operatively connected to the sewing machine to move the same in one direction under extending movements of the plunger and in the opposite direction under retracting movements of the plunger, a source of fluid pressure, fluid connections between the high and low pressure sides of said fluid pressure source and opposite ends of each of said cylinders, and control valve means interposed in said fluid connections, said valve means operative in one position to impart rotary movements only to the feed rollers and in another position to impart reciprocal movements only to the sewing machine.

3. The structure defined in claim 2 in further combination with means operatively associated with each of said plungers for independently actuating said control valve means to alternately impart rotary movements to said rollers and reciprocal movements to said sewing machine.

4. In a machine of the kind described, cooperating feed rollers, a double-ended cylinder and cooperating plunger-equipped piston, power-transmitting connections between the said plunger and the feed rollers converting reciprocating motion of the plunger into rotary motion of the feed rollers, a sewing machine mounted for reciprocating movements transversely of the line of feed, a double-ended cylinder and cooperating piston-equipped plunger rod connected to the sewing machine to move the same in one direction under extending movements of the plunger and in the opposite direction under retracting movements of the plunger, a source of fluid pressure, fluid connections between the high and low pressure sides of said fluid pressure source and opposite ends of each of said cylinders, and a pair of control valves in said fluid connections, each of said valves in one of its extreme positions connecting one end of its respective cylinder to the high-pressure side of the fluid source and the other end of its respective cylinder to the low-pressure side of said fluid source, each of said valves in the other of its extreme positions connecting the said other end of its respective cylinder to the high pressure side of said fluid source and the first-named end of its cooperating cylinder to the low pressure side of said fluid source, and each of said valves in its intermediate position blocking off flow to and from both ends of its respective cylinder.

5. The structure defined in claim 4 in further combination with means operatively associated with each of said plungers for independently actuating said control valves to alternately impart rotary movements to the rollers and reciprocal movements to the sewing machine.

6. In a machine of the kind described, cooperating feed rollers, a double-ended cylinder and cooperating plunger-equipped piston, power-transmitting connections between the said plunger and the feed rollers converting reciprocating motion of the plunger into rotary motion of the feed roller, a sewing machine mounted for reciprocating movements transversely of the line of feed, a double-ended cylinder and cooperating piston-equipped plunger rod connected to the sewing machine to move the same in one direction under extending movements of the plunger and in the opposite direction under retracting movements of the plunger, a source of fluid pressure, fluid connections between the high and low pressure sides of said fluid pressure source and opposite ends of each of said cylinders, a pair of control valves in said fluid connections, each of said valves in one of its extreme positions connecting one end of its respective cylinder to the high-pressure side of the fluid source and the other end of its respective cylinder to the low-pressure side of said fluid source, each of said valves in the other of its extreme positions connecting the said other end of its respective cylinder to the high-pressure side of said fluid source and the first-named end of its cooperating cylinder to the low-pressure side of said fluid source, and each of said valves in its intermediate position blocking off flow to and from both ends of its respective cylinder, and means including snap action mechanism operatively associated with each of said plungers for independently actuating said control valves to alternately impart rotary movements to said rollers and reciprocal movements to said sewing machine.

7. In a machine of the kind described, cooperating feed rollers, a double-ended cylinder and cooperating plunger-equipped piston, power-transmitting connections between the said plunger and the feed rollers converting reciprocating motion of the plunger into rotary motion of the feed rollers, a sewing machine mounted for reciprocating movements transversely of the line of feed, a double-ended cylinder and cooperating piston-equipped plunger rod connected to the sewing machine to move the same in one direction under extending movements of the plunger and in the opposite direction under retracting movements of the plunger, a source of fluid pressure, fluid connections between the high and low pressure sides of said fluid pressure source and opposite ends of each of said cylinders, a pair of control valves in said fluid connections, each of said valves in one of its extreme positions connecting one end of its respective cylinder to the high-pressure side of the fluid source and the other end of its respective cylinder to the low-pressure side of said fluid source, each of said valves in the other of its extreme positions connecting the said other end of its respective cylinder to the high-pressure side of said fluid source and the first-named end of its cooperating cylinder to the low-pressure side of said fluid source, and each of said valves in its intermediate position blocking off flow to and from both ends of its respective cylinder, and snap action mechanism responsive to the movement of either of said plungers to position said control valves to simultaneously terminate the cycle of movement thereof and initiate a cycle of movement of the other of said plungers.

8. The structure defined in claim 2 in further combination with means for varying the extent of reciprocal movements of the sewing machine.

9. The structure defined in claim 2 in further combination with means for varying the limits of the reciprocal movements of the sewing machine and further independent means for varying the rotary movements of the feed rollers.

10. The structure defined in claim 4 in further combination with means for varying the limits of movement of the plunger within one of said cylinders to thereby vary the periodic feed movements of said feed rollers.

11. The structure defined in claim 4 in further combination with means for varying the limits of movement of said plungers within said cylinders to thereby vary the periodic rotary feeding movements of said feed rollers and the periodic reciprocal movements of said sewing machine.

12. In a machine of the class described, a frame, a cooperating pair of feed rollers mounted on said frame and adapted to receive material between them, a double-ended cylinder carried by said frame, a cooperating plunger equipped piston in said cylinder, power-transmitting connections between said plunger and the feed rollers converting reciprocating motion of the plunger and the rotary motion of the feed rollers, a carriage mounted on said frame for reciprocating movements transversely of the line of feed, a sewing machine mounted on said carriage, a second double-ended cylinder carried by said frame, a cooperating piston equipped plunger rod working in said second cylinder and connected to said carriage to move the same in one direction under extending movements of the plunger and in the opposite direction under retracting movements of the plunger, a motor mounted on said frame, driving connections between said motor and said sewing machine, a source of fluid pressure, fluid connections between the high and low pressure sides of said fluid pressure source and opposite ends of each of said cylinders, a pair of control valves in said fluid connections, each of said valves in one of its extreme positions connecting one end of its respective cylinder to the high pressure side of the fluid source and the other end of its respective cylinder to the low pressure side of its fluid source, each of said valves in the other of its extreme positions connecting the said other end of its respective cylinder to the high pressure side of said fluid source and the first-named end of its cooperating cylinder to the low pressure side of said fluid source, and each of said valves in its intermediate position blocking off flow to and from both ends of its respective cylinder, snap action mechanism operatively associated with said reciprocating carriage for positioning said control valves to simultaneously stop movement of said carriage and initiate rotary feed movements of the feed rollers, and snap action mechanism operatively associated with said rollers for positioning said control valves to simultaneously stop rotary movements of said feed rollers and initiate reciprocal movement of said carriage.

13. In a machine of the kind described, cooperating feed rollers, a double-ended cylinder and cooperating plunger-equipped piston, power-transmitting connections between the said plunger and the feed rollers converting reciprocating motion of the plunger into rotary motion of the feed rollers, a sewing machine mounted for reciprocating movements transversely of the line of feed, a double-ended cylinder and cooperating piston-equipped plunger rod operatively connected to the sewing machine to move the same in one direction under extending movements of the plunger and in the opposite direction under retracting movements of the plunger, a source of fluid pressure, a pair of valve bodies, fluid connections between each one of said valve bodies and opposite ends of one each of said cylinders, fluid connections between each of said valve bodies and the high pressure side of said fluid source, fluid connections between said valve bodies and the low pressure side of said fluid source, valve elements movable in said valve bodies, said valve elements in one position within said valve bodies permitting passage of fluid from the high pressure side of said fluid source to one end of its cooperating cylinder and passage of fluid from the other end of its cooperating cylinder to said low pressure side of said fluid source, said valve elements in a second position permitting passage of fluid from the high pressure side of the fluid source to the other end of said cylinder and passage of fluid from the first-named end of said cylinder to the low pressure side of said fluid source, said valve elements in a third position within said valve bodies blocking off passage of fluid to and from both ends of its respective cooperating cylinder, snap action mechanism operatively responsive to the movement of said plungers, and linkage connecting said snap action mechanism to said valve elements to place one of said valve elements in a position to block off flow of fluid to and from both ends of its respective cylinder and simultaneously positioning the other of said valve elements in a position within its cooperating valve body to permit passage of fluid from the high pressure side of the fluid source to the other end of its respective cylinder.

14. The structure defined in claim 13 in which the snap action mechanism includes cocking mechanism controlled by movements of the carriage and tripping means for said snap action mechanism carried by said carriage and one of said plungers.

15. In a device of the class described, feed roller mechanism, a double-ended cylinder and cooperating plunger-equipped piston, power-transmitting connections between the said plunger and said feed roller mechanism converting reciprocated motion of the plunger into rotary motion of the feed roller mechanism, a carriage mounted for reciprocating movements transversely of the line of feed, a double-ended cylinder and cooperating piston-equipped plunger rod connected to the carriage to move the same in one direction under extending movements of the plunger and in the opposite direction under retracting movements of the plunger, a source of fluid pressure, fluid connections between the high and low pressure sides of the fluid pressure source and opposite ends of each of said cylinders, control valve means interposed in said fluid connections, said control valve means operative in one position to impart rotary movements only to the feed rollers and in another position to impart reciprocal movements only to the carriage, a snap action element, means associated with said carriage for imparting bias to said snap action element during the cycle of travel of said carriage in either direction, means responsive to the movements of said carriage in either direction for releasing said snap action element, linkage responsive to the movement of said snap action element upon release thereof for actuating the control valve means to simultaneously terminate the cycle of travel of the carriage and initiate a cycle of feeding movements to the feed roller mechanism, a second snap action element, means associated with said carriage for imparting bias thereto during the cycle of travel of said carriage in either direction, means responsive to the movements of said feed roller mechanism for releasing said snap action element, and linkage responsive to the movements of said snap action element and operatively associated with said first-mentioned linkage to actuate said control valve means to simultaneously terminate the cycle of movement of the feed roller mechanism and initiate a cycle of movement of said carriage.

16. The structure defined in claim 15 in which said control valve means includes a pair of control valves having reciprocating valve elements, each operatively associated with one of said cylinders, each of said valves in one of its extreme positions connecting one end of its cooperating cylinder to the high pressure side of the fluid source and the other end of its cooperating cylinder to the low pressure side of said fluid source, each of said valves in the other of its extreme positions connecting the said other end of its cooperating cylinder to the high pressure side of the fluid source and the first-named end of its cooperating cylinder to the low pressure side of said fluid source, and each of said valves in its intermediate position blocking off flow to and from both ends of its cooperating cylinders.

17. The structure defined in claim 15 in further combination with a frame, and in which each of said snap action elements comprises a push rod mounted in said frame for sliding movements substantially parallel to the carriage, a pair of spaced abutments on said push rods, a coil compression spring encompassing said push rod intermediate said abutments, cam means on the carriage, lever means on said frame adapted to cooperate with said cam means on the carriage to compress the spring on the push rod, and a pair of tripping dogs on said frame adjacent the abutments on said push rod normally lying in the path of said abutments whereby to provide a base of resistance for said spring.

18. The structure defined in claim 15 in further combination with means for varying the limitations of movement of said plungers within said cylinders to thereby vary the periodic rotary feeding movements of said feed roller mechanism and periodic reciprocal movements of said carriage.

19. In a machine of the class described, a frame, a cooperating pair of feed rollers mounted on said frame and adapted to receive material between them, a double-ended cylinder carried by said frame, a cooperating plunger-equipped piston in said cylinder, power-transmitting connections between said plunger and the feed rollers converting reciprocating motion of the plunger and the rotary motion of the feed rollers, a carriage mounted on said frame for reciprocating movements transversely of the line of feed, a sewing machine mounted on said carriage, a second double-ended cylinder carried by said frame, a cooperating piston-equipped plunger rod working in said second cylinder and connected to said carriage to move the same in one direction under extending movements of the plunger and in the opposite direction under retracting movements of the plunger, a source of fluid pressure, a pair of valve bodies, fluid connections between one each of said valve bodies and opposite ends of one each of said cylinders, fluid connections between each of said valve bodies and the high pressure side of said fluid source, fluid connections between said valve bodies and the low pressure side of said fluid source, valve elements movable in said valve bodies, said valve elements in one position within said valve bodies permitting passage of fluid from the high pressure side of said fluid source to one end of its cooperating cylinder and passage of fluid from the other end of its cooperating cylinder to the low pressure side of said fluid source, said valve elements in a second position permitting passage of fluid from the high pressure side of the fluid source to the other end of said cylinder and passage of fluid from the first-named end of said cylinder to the low pressure side of said fluid source, said valve elements in a third position within said valve bodies blocking off passage of fluid to and from both end of its cooperating cylinder, a pair of push rods mounted in said frame for sliding movements substantially parallel to the carriage, a pair of spaced abutments on each of said push rods, a coil compression spring encompassing each of said push rods intermediate said abutments, a pair of opposed cams on said carriage, bell cranks on said frame adapted to cooperate with said cams on said carriage to compress the springs on said push rods under movements of the carriage in either direction, dogs on said frame adjacent the abutments on said push rods and normally lying in the path of said abutments to provide bases of resistance for said springs, linkage connecting one of said push rods to said control valve elements, linkage connecting the other of said push rods to said first-mentioned linkage for cooperation therewith to operate said valve elements, a pair of trip rods slidably mounted on said frame, one each adjacent one of said push rods, means carried by said trip rods for moving said dogs out of engagement with said abutments, lugs carried by said trip rods, a trip finger on said carriage adapted to engage the lugs on one of said trip rods under extreme reciprocal movements of said carriage, and a tripping element operatively associated with said feed roller mechanism adapted to engage the lugs on the other of said trip rods under feeding movements of the feed roller mechanism.

20. The structure defined in claim 19 in further combination with spring means biasing said dogs toward the path of travel of said abutments.

21. The structure defined in claim 19 in which the lugs on said trip rods are longitudinally adjustable thereon, whereby to vary the stroke of the plungers within their respective cylinders.

22. In a machine of the kind described, a cooperating pair of feed rollers adapted to receive material between them, a pair of pinion gears, a pair of gear racks mounted for reciprocating movements and each meshing with a different one of said pinion gears, driving connections between each of said pinion gears and one of said feed rollers involving a pair of over-riding clutches, and means for simultaneously reciprocating the said gear racks, said over-riding clutches being constructed and arranged to impart feeding movements to the coupled feed rollers one under extending movements of the gear racks and the other on retracting movements of the gear racks, said means for simultaneously reciprocating the gear racks comprising a double-ended hydraulic cylinder, a plunger rod-equipped piston working in the cylinder, a source of fluid pressure with connections in opposite ends of the cylinder, and mechanical connections between the extended end of the plunger rod and said gear racks.

23. In a machine of the kind described, a co-operating pair of feed rollers adapted to receive material between them, a pair of pinion gears, a drive shaft projecting axially from one end of one of said rollers, a pair of over-riding clutches on said drive shaft in side-by-side relationship, a pair of pinion gears operatively associated with said over-riding clutches, a pair of gear racks mounted for reciprocating movements and each meshing with one of said pinion gears, and means for simultaneously reciprocating said gear racks, said over-riding clutches being constructed and arranged to impart feeding movements to the coupled feed rollers one under extending movements of the gear racks and the other on retracting movements of the gear racks, said means for simultaneously reciprocating the gear racks comprising a double-ended hydraulic cylinder, a plunger rod-equipped piston working in the cylinder, a source of fluid pressure with connections in opposite ends of the cylinder, and mechanical connections between the extended end of the plunger rod and said gear racks.

24. In a machine of the kind described, a co-operating pair of feed rollers adapted to receive material between them, a pair of pinion gears, a pair of gear racks mounted for reciprocating movements and each meshing with a different one of said pinion gears, driving connections between each of said pinion gears and one of said feed rollers involving a pair of over-riding clutches, means for simultaneously reciprocating the said gear racks, said over-riding clutches being constructed and arranged to impart feeding movements to the coupled feed rollers one under extending movements of the gear racks and the other on retracting movements of the gear racks, and means for varying the strokes of the gear racks to thereby vary the feeding travel of each of the feed rollers during each operating cycle.

MICHAEL BECHIK.
JOEL G. STRANDBERG.

REFERENCES CITED

The following references are of record in the file of this patent:

UNITED STATES PATENTS

| Number | Name | Date |
|---|---|---|
| 87,353 | Metten | Mar. 2, 1869 |
| 421,816 | Coles | Feb. 18, 1890 |
| 425,534 | Brener | Apr. 15, 1890 |
| 2,049,292 | Feldmann | July 28, 1936 |
| 2,059,845 | Bowersox | Nov. 3, 1936 |
| 2,325,643 | Weis | Aug. 3, 1943 |
| 2,382,486 | Kelly | Aug. 14, 1945 |